Aug. 14, 1928.
C. A. ERNST
1,680,603
STEERING DEVICE
Filed Jan. 3, 1927
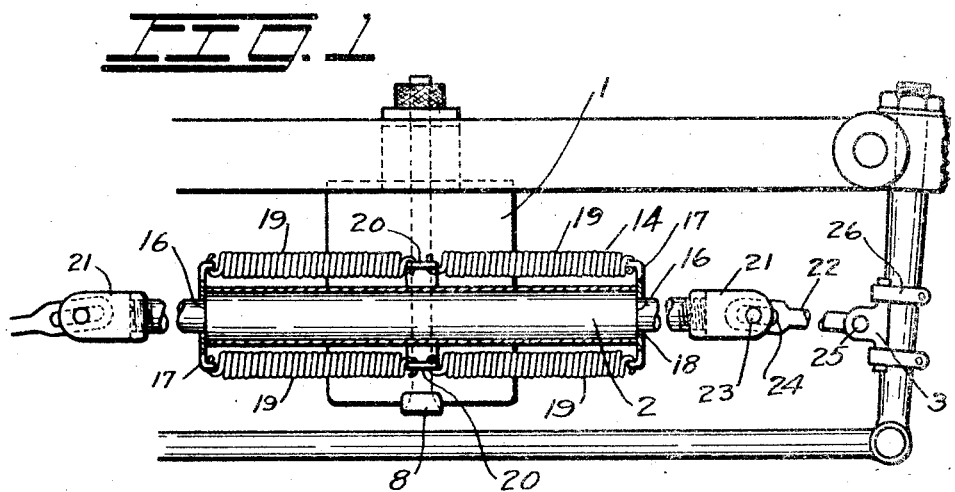
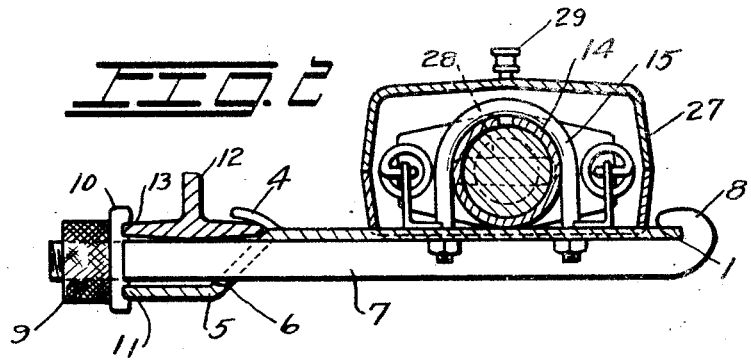
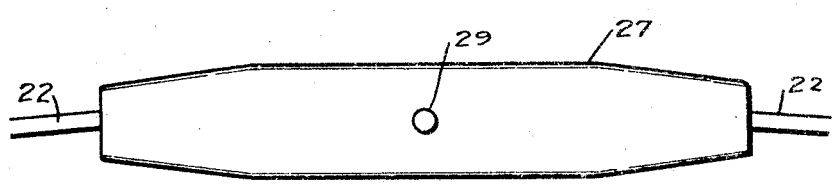
Inventor
Charles A. Ernst
By Harry Bowen
Attorney Patented Aug. 14, 1928.

1,680,603

UNITED STATES PATENT OFFICE.

CHARLES A. ERNST, OF RAINIER, WASHINGTON, ASSIGNOR OF ONE-HALF TO FRANK McDONALD, OF RAINIER, WASHINGTON.

STEERING DEVICE.

Application filed January 3, 1927. Serial No. 158,491.

The invention is a steering or stabilizing device that is connected in the steering apparatus of a motor vehicle to eliminate all slack and play in the connections which will steady the wheel and eliminate shimmying.

The object of the invention is to provide means for taking up slack and play in steering connections to eliminate shimmying or unsteadiness.

Another object of the invention is to provide a device for steadying the steering wheel of a motor vehicle which may be readily attached.

Another object of the invention is to provide means for holding both of the steering arms of a motor vehicle in tension at all times.

A further object of the invention is to provide a stabilizing device that may readily be installed without disconnecting or disturbing any of the steering connections.

And a still further object of the invention is to provide a stabilizing device of the class described which is of a simple and economical construction.

With these ends in view the invention embodies, a rod slidably held in a sleeve, oppositely acting springs connected to the ends of the said rod, a support for holding the device to a part of the vehicle and suitable connections between the ends of the rod and the steering knuckle arms.

Other features and advantages of the invention, will appear from the following description, taken in connection with the drawings, wherein:

Figure 1 is a plan view of the device with the housing removed and a portion broken away.

Figure 2 is a cross section through the center of the device.

Figure 3 is a plan view of the housing.

In the drawings the device is shown as it would be made, wherein numeral 1 indicates a base plate, numeral 2 a slidable bar upon which the device is formed and numeral 3 a connection to the steering knuckle arm of a motor vehicle.

The plate 1 may be made as shown in Figures 1 and 2 with a lip 4 projecting upward at one end and a downwardly extending portion 5 below the said lip, as shown in Figure 2. The downwardly extending portion 5 is provided with an opening 6 through which a bolt 7 passes. The outer end of the bolt is bent upward and over to form a hook 8 that holds the outer ends of the plate 1 and the opposite end is threaded and provided with a nut 9 which holds the bolt and plate through a washer 10 that grips the edge of the plate through a notch 11 and also the edge of the front axle of a motor vehicle which is indicated by the numeral 12 through a notch 13. The axle is held between the notch 13 and the extension 4, as shown.

The bar 2 is slidably held in a sleeve 14 and the sleeve is clamped to the plate 1 by U bolts 15, as shown. At the ends of the sleeve 14, the bar 2 is provided with shoulders 16, and plates 17, having openings 18 in them that fit around the bar, are placed over the ends of the bar and attached to the ends of springs 19. The inner end of the springs 19 are attached to clips 20, as shown. It will be observed that as the bar 2 is moved outward in one direction the springs 19 at that end will resiliently hold the bar and the sleeve 14 will hold the springs at the opposite end in the position shown. At the outer ends of the bar 2 are members 21 in which rods 22 are pivotally mounted on pins 23 in slots 24. The opposite ends of the bars 22 are pivotally mounted in the clamps 3 through pins 25 and the clamps 3 are clamped to the steering knuckle arm by small clamps 26. The bar 2 and springs 19 are enclosed in a housing 27 as shown in Figures 2 and 3 and this housing extends lengthwise to cover the members 21, and the outer ends are provided with slots 28 through which the bars 22 pass. A grease cup 29 may be placed in the top of the housing. It will be observed that the grease cup will be directly above a small opening in the top of the sleeve 14 so that grease may be fed directly to the slidable bar 2.

It will be understood that changes may be made in the construction without departing from the spirit of the invention, one of which changes may be in the shape or design of the bar 2, another may be in the arrangement of the springs, or in the use of other means for attaching them to the bar, another may be in the use of other means for supporting the bar and still another may be in the use of other means for connecting the ends of the bar to the arms of the steering knuckle.

The construction will be readily understood from the foregoing description. To use the device it may be installed, as shown and described and it will be observed that as the wheels are turned in one direction the slidable rod will be forced in the opposite direction and the springs will hold it in tension so that all of the connections will be held rigid. This device will therefore have an equalizing effect and tend to hold the wheels of the vehicle in a straight ahead position at all times. As tension will be placed on all connections, all play or slack will be removed and the steering wheel will be held rigid at all times.

Having thus fully described my invention, what I claim as new and desire to secure by Letters Patent, is:

1. In a steering device, a slidable rod, a sleeve in which the said rod is mounted, a bracket for supporting the said sleeve, transverse connections adjacent the ends of the said rod, springs attached to these connections at one end and to a central stationary member at the opposite end, rods pivotally attached to the ends of the said slidable rod and suitable connections for attaching the ends of the said latter rods to the steering knuckle arms of a motor vehicle.

2. In a steering device, a slidable rod, a sleeve in which the said rod is mounted, means for supporting the said sleeve from a fixed part of the vehicle, transverse connections adjacent the end of the said rod, springs attached to these connections at one end and to a central stationary member at the opposite end, rods pivotally attached to the ends of the said slidable rod and suitable connections for attaching the ends of the said latter rods to the steering knuckle arms of a motor vehicle.

3. In a steering device, a rod, means for slidably supporting the said rod, transverse connections adjacent the end of the said rod, springs attached to these connections at one end and to a central stationary member at the opposite end, rods pivotally attached to the ends of the said slidable rod and suitable connections for attaching the ends of the said latter rods to the steering knuckle arms of a motor vehicle.

In testimony whereof I affix my signature.

CHARLES A. ERNST.